United States Patent [19]

Slaton

[11] 4,306,520
[45] Dec. 22, 1981

[54] WATER VAPOR INJECTOR FOR COMBUSTION ENGINE AIR INTAKE

[76] Inventor: David E. Slaton, 4 Glenmere Dr., Little Rock, Ark. 72204

[21] Appl. No.: 104,767

[22] Filed: Dec. 18, 1979

[51] Int. Cl.³ .......................................... F02M 25/04
[52] U.S. Cl. .............................. 123/25 A; 123/25 E; 123/25 L; 123/198 A
[58] Field of Search ............... 123/25 R, 25 A, 25 E, 123/25 L, 198 A; 261/18 A

[56] References Cited

U.S. PATENT DOCUMENTS

| | | | |
|---|---|---|---|
| 1,225,684 | 5/1917 | Shaven | 123/25 A |
| 2,715,392 | 8/1955 | Grevas | 123/25 A |
| 2,965,085 | 12/1960 | Kahler | 123/198 A |
| 3,975,466 | 8/1976 | Bradshaw | 123/25 R |
| 3,987,774 | 10/1976 | Waag | 123/25 R |
| 3,991,724 | 11/1976 | Geiser | 123/25 A |
| 4,096,829 | 6/1978 | Spears | 123/25 L |
| 4,166,435 | 9/1979 | Riang | 123/25 A |

Primary Examiner—Ira S. Lazarus
Attorney, Agent, or Firm—Harvey B. Jacobson

[57] ABSTRACT

An air cleaner for a combustion engine including air and fuel induction passages is provided and the air cleaner defines an inner chamber downstream from an associated air filter element. The inner chamber opens into the air and fuel induction passages of the engine and a reservoir for an evaporative liquid is provided, including an upper portion defining a filtered air inlet and a vapor outlet. An elongated conduit extends between and communicates the vapor outlet with the inner chamber within the air cleaner and a liquid absorbent and porous body is provided within the chamber for floating on the liquid therein, the body when in use defining increased wetted surface area from which liquid contained within the reservoir may be evaporated by air entering the reservoir through the air inlet and being drawn from the reservoir through the vapor outlet.

2 Claims, 3 Drawing Figures

WATER VAPOR INJECTOR FOR COMBUSTION ENGINE AIR INTAKE

BACKGROUND OF THE INVENTION

The recent emphasis on reduction of combustion engine exhaust pollutants and combustion engine efficiency has created ever more demand for an efficient manner of reducing engine exhaust pollutants and increasing the fuel mileage of conventional motor vehicles.

Although various forms of liquid vaporizing attachments have been heretofore provided for use in conjunction with combustion engines such as those devices disclosed in U.S. Pat. Nos. 2,216,722, 2,471,012, 2,598,445, 2,632,637 and 3,834,360, these previously known forms of vaporizing attachments are in some instances too complex for efficient operation over long periods of time or they are ineffective to a great degree in providing the desired results. Accordingly, a need exists for a simplified liquid vaporizer which may be utilized in conjunction with an internal combustion engine to reduce the engine exhaust pollutants and to increase the fuel efficiency of the engine.

BRIEF DESCRIPTION OF THE INVENTION

The vapor injector of the instant invention is constructed in a manner whereby it may be readily provided on new motor vehicles as well as added as attachments for existing motor vehicles. The injector utilizes no valves or small dimension restrictive portions which may be subject to clogging and other malfunctions. Further, the injector is reliant only upon engine vacuum, a supply of liquid to be vaporized and a reasonably efficient air filter element. Accordingly, the injector of the instant invention is operable over extended periods of time without maintenance and without the need for adjustments or cleaning, other than to replace a simple air filtering element.

The main object of this invention is to provide an efficient liquid vapor injector for an internal combustion engine.

Another object of this invention is to provide a liquid vapor injector specifically adapted for use in conjunction with motor vehicle engines.

Still another important object of this invention is to provide a vapor injector which will be capable of vaporizing different liquids and mixtures of liquids, as desired.

A further object of this invention is to provide a vapor injector for an internal combustion engine which will require only slightly modification of the cover portion of a conventional carburetor air cleaner when installing the vapor injector as an attachment to an existing motor vehicle engine.

A final object of this invention to be specifically enumerated herein is to provide a vapor injector in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
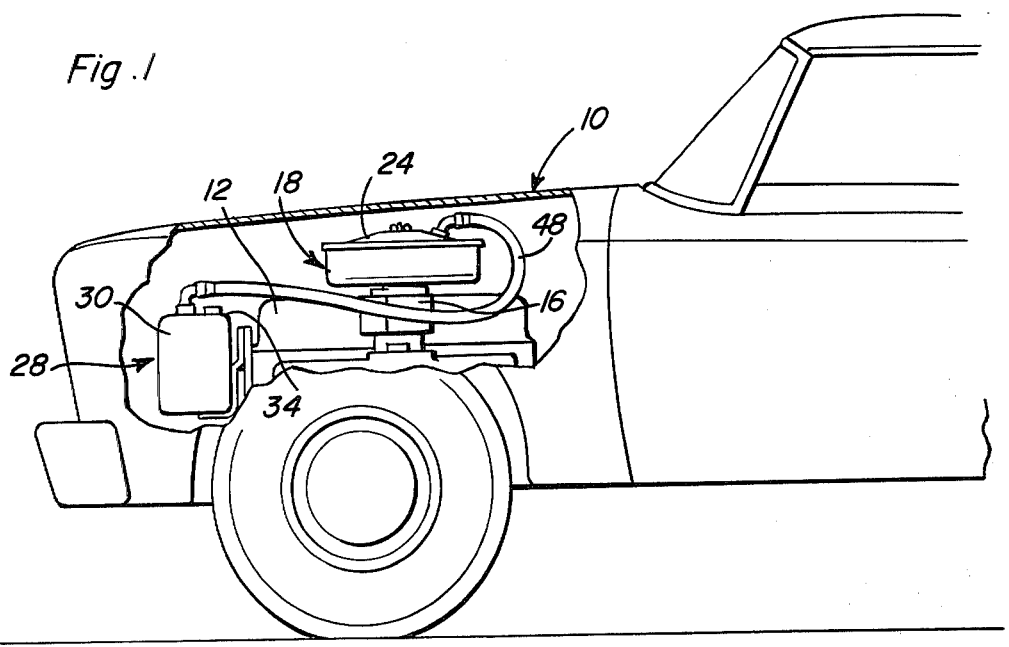
FIG. 1 is a fragmentary side elevational view of the forward portion of a conventional form of motor vehicle as seen from the left side thereof and with the near portions of the vehicle body being broken away in order to illustrate the installation of the vapor injector of the instant invention on the combustion engine of the vehicle.
Figure 2:
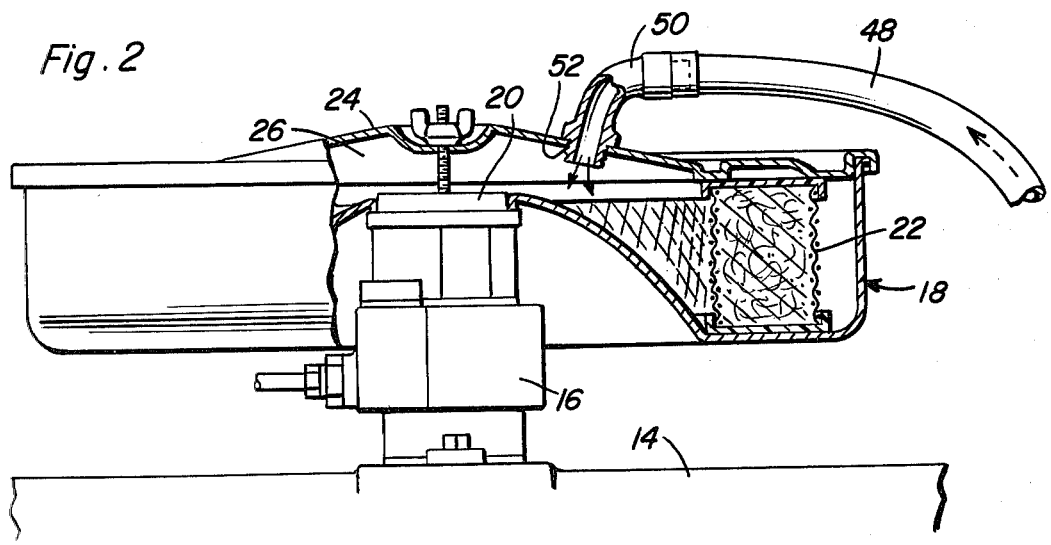
FIG. 2 is an enlarged fragmentary vertical sectional view of the engine air cleaner portion of the engine illustrating the manner in which the vapor tube of the injector is operatively associated with the engine air cleaner.
Figure 3:
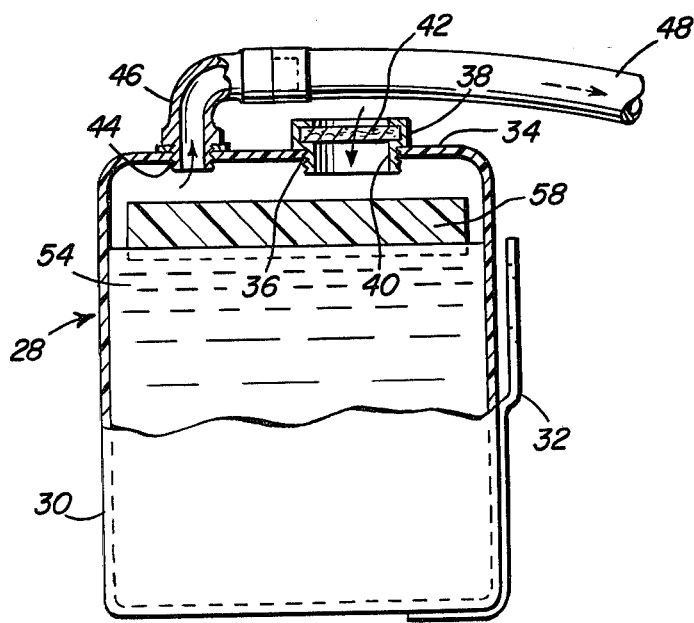
FIG. 3 is an enlarged elevational view of the liquid reservoir portion of the invention with portions thereof being broken away and illustrated in vertical section to show the liquid absorbent porous body floatable on the liquid within the reservoir and the air filtering element for the air inlet for the reservoir.

Referring now more specifically to the drawings, the numeral 10 generally designates a conventional form of motor vehicle including a combustion engine 12 of the naturally aspirated type and equipped with an intake manifold 14 upon which a conventional carburetor 16 is mounted, a conventional engine air cleaner assembly referred to in general by the reference numeral 18 being mounted on the air horn or inlet 20 of the carburetor 16. The air cleaner assembly 18 includes a removable air cleaner element 22 and a removable top 24 which enables the air cleaner element 22 to be replaced. In addition, the air cleaner assembly 18 defines an inner chamber 26 downstream from the air cleaner element 22 and upstream from the throttle plate (not shown) of the carburetor 16 and the inner chamber 26 is in direct communication with the air horn or air inlet 20 of the carburetor 16 comprising a part of the air and fuel induction passage of the engine 12.

The vapor injector of the instant invention is referred to in general by the reference numeral 28 and includes a reservoir 30 having a bracket 32 supported therefrom and the bracket 32 may be mounted in any convenient manner to a supportive bracket 34 on the engine 12. The reservoir 30 includes a top wall 34 equipped with an inlet opening 36 and the inlet opening 36 is closed by a removable closure cap 38 having a passage 40 extending therethrough and equipped with an air filtering disk 42 for filtering air entering the reservoir 30 through the cap 38. In addition, top wall 34 includes an outlet opening 44 in which one end of an outlet fitting 46 is secured and a first end of an elongated flexible conduit 48 is secured over the other outlet end of the fitting 46. The second end of the conduit 48 is secured over the inlet end of an inlet fitting 50 whose outlet end is secured through an opening 52 formed in the removable top 24 of the air cleaner assembly 18. Accordingly, the fittings 46 and 50 and the conduit 48 communicate the upper portion of the interior of the reservoir 30 with the inner chamber 26 of the air cleaner assembly 18 defined immediately below the central portion of the removable top 24 of the air cleaner assembly 18.

In operation, engine vacuum (at operating speeds above idle speeds) is partially effective in the chamber 26 and thus causes air and vapor to be drawn through the conduit 48 from the upper portion of the interior of the reservoir 30. An evaporative liquid 54 is contained within the reservoir 30 and a liquid absorbent and porous body 58 is floated on the liquid 54 and defines a very large area of wetted surfaces from which the liquid 54 may be vaporized responsive to air being drawn in through the air filter element 42 into the upper portion of the reservoir 30 and from the latter through the fitting 46 and conduit 48. The vaporized liquid then passes through the line 48, the fitting 50 and into the chamber 26. In this manner, a vapor enriched supply of air is ducted down through the air horn or inlet 20 and into the carburetor 16 for enrichment by fuel therein.

Of course, the liquid 54 within with container or reservoir 30 may be of any suitable type. It may comprise water, only, a mixture of water and alcohol or any other suitable liquid or mixture according to the type of engine improvement desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a combustion engine including an air cleaner defining an inner chamber downstream from an associated air filter element and which opens into the air inlet of a carburetor mounted on and operable to supply a mixture of air and fuel to the air and fuel induction passages of said engine, a reservoir for containing an evaporative liquid, an upper portion of said reservoir including a filtered air inlet and a vapor outlet, and an elongated vapor conduit extending between and communicating said vapor outlet and inner chamber, a liquid absorbent porous body disposed within said reservoir for free vertical movement therein and comprising a buoyant body which may be floated on various liquids contained within said reservoir including water, alcohol and lighter engine fuels, such as gasoline and methonal, said air cleaner being of the conventional type defining an upwardly opening horizontal annulus for receiving an annular air cleaning element in the outer peripheral portion thereof and equipped with a disk-shaped cover, said elongated conduit including an outlet end fitting threaded downwardly through a portion of said cover inward of the outer peripheral portion of said annulus.

2. The combination of claim 1 wherein said reservoir includes a liquid inlet opening, said filtered air inlet comprising a removable closure for said inlet opening.

* * * * *